(12) United States Patent
Guvenc et al.

(10) Patent No.: US 8,280,387 B2
(45) Date of Patent: Oct. 2, 2012

(54) FEMTOCELL CHANNEL ASSIGNMENT AND POWER CONTROL FOR IMPROVED FEMTOCELL COVERAGE AND EFFICIENT CELL SEARCH

(75) Inventors: Ismail Guvenc, Santa Clara, CA (US);
Moo Ryong Jeong, Saratoga, CA (US);
Fujio Watanabe, Union City, CA (US);
Hiroshi Inamura, Cupertino, CA (US)

(73) Assignee: NTT DoCoMo, Inc., Tokyo (JP)

( * ) Notice: Subject to any disclaimer, the term of this patent is extended or adjusted under 35 U.S.C. 154(b) by 481 days.

(21) Appl. No.: 12/463,307

(22) Filed: May 8, 2009

(65) Prior Publication Data

US 2009/0291690 A1 Nov. 26, 2009

Related U.S. Application Data

(60) Provisional application No. 61/055,345, filed on May 22, 2008, provisional application No. 61/073,276, filed on Jun. 17, 2008.

(51) Int. Cl.
*H04W 40/00* (2009.01)
*H04B 7/00* (2006.01)
*H04B 15/00* (2006.01)

(52) U.S. Cl. .......... 455/449; 455/446; 455/447; 455/62; 455/522

(58) Field of Classification Search .......... 455/444–455, 455/67.11–68, 62, 522
See application file for complete search history.

(56) References Cited

U.S. PATENT DOCUMENTS

| | | | |
|---|---|---|---|
| 5,657,343 A * | 8/1997 | Schilling | 375/133 |
| 5,809,423 A * | 9/1998 | Benveniste | 455/452.2 |
| 5,920,819 A * | 7/1999 | Asanuma | 455/447 |
| 5,960,352 A * | 9/1999 | Cherpantier | 455/451 |
| 6,212,386 B1 * | 4/2001 | Briere et al. | 455/447 |

(Continued)

FOREIGN PATENT DOCUMENTS

WO  WO 2005011156 A1 *  2/2005

(Continued)

OTHER PUBLICATIONS

PCT International Search Report for International Patent Application No. PCT/US2009/043573 dated Jun. 30, 2009, 3 pages.

(Continued)

*Primary Examiner* — Matthew Sams
(74) *Attorney, Agent, or Firm* — Haynes & Boone, LLP.

(57) ABSTRACT

A method and a communication system including femtocells within a macrocell efficiently manage interference between the different femtocells, and between each femtocell and a macrocell. An efficient frequency assignment scheme for the femtocells minimizes interference between a femtocell and a macrocell and among different femtocells using a spectrum-sensing technique carried out by the femtocells. The frequency assignment scheme selects a suitable channel from a set of candidate channels and ensures that the femtocell has an acceptable coverage area even when it is close to the macrocell base station (BS). The frequency assignment scheme favors a co-channel implementation to take advantage of the hand-off and cell search characteristics of the co-channel implementation. In one embodiment, a joint power control and frequency band assignment technique is used, which partitions the coverage area of the macrocell into an inner region, a power control region, and an outer region. Depending on a femtocell's location, it is assigned a certain power level and a frequency band. Power control may be used within the power-control region while, in the other regions, a fixed transmission power may be used.

8 Claims, 9 Drawing Sheets

U.S. PATENT DOCUMENTS

| | | | |
|---|---|---|---|
| 6,212,405 B1 * | 4/2001 | Jiang et al. | 455/561 |
| 6,438,379 B1 * | 8/2002 | Gitlin et al. | 455/449 |
| 6,751,444 B1 * | 6/2004 | Meiyappan | 455/69 |
| 6,792,276 B1 * | 9/2004 | Butovitsch et al. | 455/453 |
| 6,853,845 B2 * | 2/2005 | Hsu et al. | 455/449 |
| 6,961,577 B2 * | 11/2005 | Nagato et al. | 455/450 |
| 6,975,865 B1 * | 12/2005 | Vaisanen | 455/444 |
| 6,999,725 B2 * | 2/2006 | Nitta et al. | 455/63.1 |
| 7,058,416 B2 * | 6/2006 | Wang | 455/464 |
| 7,142,861 B2 * | 11/2006 | Murai | 455/444 |
| 7,483,704 B2 * | 1/2009 | Shimada et al. | 455/453 |
| 8,160,591 B2 * | 4/2012 | Xu et al. | 455/444 |
| 2002/0098860 A1 * | 7/2002 | Pecen et al. | 455/522 |
| 2002/0177444 A1 * | 11/2002 | Nagato et al. | 455/446 |
| 2003/0017829 A1 * | 1/2003 | Ching-Hsiang et al. | 455/446 |
| 2003/0109284 A1 * | 6/2003 | Akerberg et al. | 455/561 |
| 2005/0059403 A1 * | 3/2005 | Wang | 455/446 |
| 2005/0130662 A1 * | 6/2005 | Murai | 455/444 |
| 2005/0148336 A1 * | 7/2005 | Nagato et al. | 455/450 |
| 2006/0154684 A1 * | 7/2006 | Meiyappan | 455/522 |
| 2006/0276197 A1 * | 12/2006 | Heo | 455/450 |
| 2007/0087738 A1 * | 4/2007 | Melkesetian | 455/422.1 |
| 2007/0183427 A1 | 8/2007 | Nylander et al. | |
| 2007/0242769 A1 * | 10/2007 | Yang | 375/260 |
| 2007/0254620 A1 | 11/2007 | Lindqvist et al. | |
| 2007/0270151 A1 * | 11/2007 | Claussen et al. | 455/444 |
| 2008/0232320 A1 * | 9/2008 | Lee et al. | 370/329 |
| 2009/0040972 A1 * | 2/2009 | Robson et al. | 370/329 |
| 2009/0052395 A1 * | 2/2009 | Bao et al. | 370/331 |
| 2009/0081970 A1 * | 3/2009 | Yavuz et al. | 455/114.2 |
| 2009/0082031 A1 * | 3/2009 | Kim et al. | 455/452.2 |
| 2009/0088083 A1 * | 4/2009 | Fujii et al. | 455/69 |
| 2009/0131070 A1 * | 5/2009 | Tajima et al. | 455/455 |
| 2009/0186623 A1 * | 7/2009 | Matsuzawa | 455/447 |
| 2010/0120438 A1 * | 5/2010 | Kone et al. | 455/444 |
| 2010/0216478 A1 * | 8/2010 | Buddhikot et al. | 455/450 |
| 2011/0003597 A1 * | 1/2011 | Budic et al. | 455/450 |
| 2011/0194495 A1 * | 8/2011 | Seo et al. | 370/328 |

FOREIGN PATENT DOCUMENTS

| | | |
|---|---|---|
| WO | 2007/139460 | 12/2007 |

OTHER PUBLICATIONS

PCT Written Opinion of the International Searching Authority for International Patent Application No. PCT/US2009/043573 dated Jun. 30, 2009, 3 pages.

Partho Choudhury and Deepak Dahuja, "UMA and Femtocells: Making FMC Happen", *White Paper*, Dec. 2007. [Online] Available: http://www.parthochoudhury.com/UMAFemto.doc.

Airvana Inc., "Femto Cells: Personal Base Stations", *White Paper*, 2007. [Online] Available: http://www.airvana.com/files/Femto_Overview_Whitepaper_FINAL_12-July-07.pdf.

PicoChip Designs Ltd., "The Case for Home Base Stations," *White Paper*, Apr. 2007. [Online] Available: http://www.picochip.com/downloads/27c85c984cd0d348edcffe7413f6ff79/femtocell_wp.pdf.

Lester T. W. Ho and Holger Claussen, "Effects of User-Deployed, Co-Channel Femtocells on the Call Drop Probability in a Residential Scenario," in *Proc. of IEEE Int. Symp. on Personal, Indoor and Mobile Radio Communications (PIMRC)*, pp. 1-5, Sep. 2007.

Vikram Chandrasekhar and Jeffrey G. Andrews, "Uplink Capacity and Interference Avoidance for Two-Tier Cellular Networks," in *Proc. IEEE Global Telecommunications Conference (GLOBECOM)*, pp. 3322-3326, Nov. 2007.

Holger Claussen, "Performance of Macro- and Co-Channel Femtocells in a Hierarchical Cell Structure," in *Proc. of IEEE Int. Symp. on Personal, Indoor and Mobile Radio Communications (PIMRC)*, pp. 1-5, Sep. 2007.

S. Kishore, L.J. Greenstein, H.V. Poor, and S.C. Schwartz, "Uplink User Capacity in a Multicell CDMA System with Hotspot Microcells," IEEE Trans. on Wireless Communications, vol. 5, No. 6, pp. 1333-1342, Jun. 2006.

Ismail Guvenc, Moo-Ryong Jeong, and Fujio Watanabe, "Co-Channel Femtocell Coverage Area Analysis", to be submitted to IEEE Commun. Lett., 2008.

Nokia Siemens Networks, "LTE Home Node B downlink Simulation results with flexible Home Node B Power", 3GPP TSR-RAN Working Group 4 (Radio) Meeting, Shanghai, China, Oct. 2007.

Huawei, "The analysis for low limit for Home NodeB transmit power requirement," 3GPP TSR-RAN Working Group 4 (Radio) Meeting, Shanghai, China, Oct. 2007.

\* cited by examiner

| Femtocell | Macrocell |
|---|---|
| Inner Region (DL) | $F_j$; $j = 1,2,...,N, j \neq i$ | $F_i$ |
| Outer Region (DL) | $F_i$ | $F_i$ |
| Inner Region (UL) | $F_{N+i}$ | $F_{N+i}$ |
| Outer Region (UL) | $F_j$; $j = N+1,...,2N, j \neq N+i$ | $F_{N+i}$ |

FIG. 10

| | Femtocell | Macrocell |
|---|---|---|
| Inner Region (DL) | $F_j$; $j = 1,2,...,N, j \neq i$ | $F_i$ |
| Power Control Region (UL) | $F_i$ | $F_i$ |
| Outer Region (DL) | $F_i$ | $F_i$ |
| Inner Region (UL) | $F_{N+i}$ | $F_{N+i}$ |
| Power Control Region (UL) | $F_j$; $j = N+1,...,2N, j \neq N+i$ | $F_{N+i}$ |
| Outer Region (UL) | $F_j$; $j = N+1,...,2N, j \neq N+i$ | $F_{N+i}$ |

FEMTOCELL CHANNEL ASSIGNMENT AND POWER CONTROL FOR IMPROVED FEMTOCELL COVERAGE AND EFFICIENT CELL SEARCH

CROSS REFERENCE TO RELATED APPLICATIONS

The present application is related to and claims priority of U.S. Provisional Patent Applications ("Copending Applications") (a) "Femtocell Channel Assignment for Improved Femtocell Coverage and Efficient Cell Search," Ser. No. 61/055,345, filed on May 22, 2008; and (b) "Joint Power Control and Frequency Assignment for Femtocells," Ser. No. 61/073,276, filed on Jun. 17, 2008.

BACKGROUND OF THE INVENTION

1. Field of the Invention

The present invention relates to wireless communication. More specifically, the present invention relates to methods for efficiently assigning channels to femtocells, taking into account hand-off, interference, coverage area, and power control considerations.

2. Discussion of the Related Art

Because mobile telephones may be used practically everywhere, they are replacing fixed wired telephones. The article, "UMA and Femtocells: Making FMC Happen" ("Choudhury"), by Partho Choudhury and Deepak Dahuja, "White Paper, December 2007. (available: at http://www.parthochoudhury.com/UMAFemto.doc), discloses (a) that approximately 30-35% of all voice calls made over a mobile network are made by mobile subscribers at their homes, and (b) about 35% of video streaming and broadcasting service uses over cellular wireless networks in 2006 took place while the mobile subscribers are at their homes.

The trend, therefore, is for the mobile telephone to become the primary or only telephone for an individual subscriber. Furthermore, the article, "Femto Cells: Personal Base Stations" ("Airvana"), published by Airvana Inc., *White Paper*, 2007 (available http://www.airvana.com/files/Femto_Overview_Whitepaper_FINAL_12-July-07.pdf), reveals that those 24 years of age or younger make up to 80% of their long distance calls on wireless networks rather than over wired networks. However, there is still much to be improved in reliability, voice quality, and cost of today's mobile telephone networks in indoor environments. Typically, the mobile telephone service is more costly than a wired telephone service, and there are dead spots and poor coverage. These deficiencies result in poor customer experience, thus preventing the mobile telephone to successfully replace the wired telephone as the primary or only telephone for most subscribers.

Choudhury, Airvana, and the article "The Case for Home Base Stations" ("PicoChip"), published by PicoChip Designs Ltd., *White Paper*, April 2007 (available http://www.picochip.com/downloads/27c85c984cd0d348edcffe7413f6ff79/femtocell_wp.pdf) all disclose a new class of base stations (BSs) designed for indoor and personal uses, The cells served by these personal BSs have come to be known as "femtocells." A femtocell (e.g., the home e-node B (HeNB) defined in the 3GPP standard) enables indoor wireless connectivity through existing broadband Internet connections. As described in Choudhury, femtocells are also featured in fixed-mobile convergence (FMC), where the subscribers are provided the ability to switch an active data/voice call session between home wireless network (e.g., femtocell) and a mobile network (e.g., a cellular network). As reported by Choudhury, Airvana and PicoChip, the benefits of femtocells include improved indoor coverage, reduced capital and operational expenditure, reduced bandwidth load, reduced power requirements, additional high-end revenue streams, improved customer royalty, increased average revenue per user, compatibility with existing handsets (without requiring dual-mode terminals), deployment in an operator-owned spectrum, and enhanced emergency services (since the femtocells are location-aware).

Despite these benefits, femtocell technology is still at its infancy. As identified in Airvana, the technical issues to be solved include those related to interference management (both between different femtocells and between the femtocell and the macrocell), efficient hand-off mechanisms, security, scalability, and access control. For example, co-channel implementations of femtocells—where the macrocell network and the femtocell network share the same frequency band—introduce serious challenges. Co-channel deployment of femtocells has desirable hand-off characteristics, as a mobile station (MS) may more efficiently scan the cells using the same frequency band compared to identifying the cells using other frequency bands, which require band-switching to accomplish the scanning. However, for distances that are close to the macrocell base station (mBS), severe interference from the mBS may prevent co-channel deployment.

The article, "Effects of User-Deployed, Co-Channel Femtocells on the Call Drop Probability in a Residential Scenario" ("Lester"), by Lester T. W. Ho and Holger Claussen, published in *Proc. of IEEE Int. Symp. on Personal, Indoor and Mobile Radio Communications (PIMRC)*, pp. 1-5, September 2007, shows that the received signals from the femtocell and the macrocell in such an implementation have identical power levels at the border of the macrocell. Thus, without adequate power control, the femtocell coverage area decreases for those femtocells that are closer to the macrocell BS (mBS). However, when the femtocell coverage area falls below a certain size, the femtocell does not completely cover a user's premise, which is the preferred coverage area. A different solution is desired, under such circumstances.

The article, "Uplink Capacity and Interference Avoidance for Two-Tier Cellular Networks" ("Chandrasekhar"), by Vikram Chandrasekhar and Jeffrey G. Andrews, published in *Proc. IEEE Global Telecommunications Conference (GLOBECOM)*, pp. 3322-3326, November 2007, derived and analyzed the uplink (UL) capacity of a co-channel femtocell network coexisting with a macrocell network (i.e., a shared-spectrum network). In a split spectrum network, the femtocell users and the macrocell users use orthogonal sub-channels. While the split spectrum network avoids interference between the macrocell and the different femtocells, the total number of users that can be supported is less than a shared spectrum network. In a shared spectrum network, a femtocell may use a sub-channel that is already used in the macrocell, so long as there is little interference between the femtocell and the portion of the macrocell network where the common sub-channel is used. In a co-channel femtocell deployment, an MS need not scan through multiple frequency bands to search for the cell.

Chadrasekhar suggests using interference avoidance methods to reduce the outage probability. For example, each macrocell user and each femtocell may employ time-hopping in order to decrease interference. Further, the macrocell and femtocell may both use a sectored antenna reception for improving the capacity. Chandrasekhar's analytical/simulation results show that, by using interference avoidance (specifically, time-hopped code-division multiple access (TH-CDMA) and sectorized antennas), up to seven times higher femtocell BS (fBS) density can be supported in a shared spectrum network, relative to to a split spectrum network with omnidirectional femtocell antennas. However, sectored antennas may be difficult to implement at the femtocells (which are necessarily, for practical considerations, simpler devices than regular BSs). Further, a time-hoping approach increases symbol duration (and hence, decreases data rate).

Lester, discussed above, analyzed hand-off probabilities for different power configurations at a femtocell. Since the manual cell-planning used in macrocell networks is not economically practical for femtocells, femtocells typically require auto-configuration capabilities (e.g., automatic power and cell size configuration). Lester's simulations show that call drop probabilities can be significantly decreased in a residential co-channel femtocell deployment through simple pilot power adaptation mechanisms.

The article, "Performance of Macro- and Co-Channel Femtocells in a Hierarchical Cell Structure" ("Claussen"), by Holger Claussen, published in *Proc. of IEEE Int. Symp. on Personal, Indoor and Mobile Radio Communications (PIMRC)*, pp. 1-5, September 2007, discloses a simple power control algorithm for pilots and data signals in femtocells. Simulation results show that the interference to the macrocell network can be minimized through intelligent power control techniques.

In Lester, Chandrasekhar and Clausen, relatively simple power control mechanisms are proposed for femtocells, so that the signal-to-interference ratio (SINR) is equal to 0 dB at the cell edge. However, depending on the distance between the mBS and the fBS, such power control strategies may not be effective. For example, as mentioned above, the maximum transmission power of a co-channel femtocell may not be sufficient to provide satsifactory coverage when the fBS is close to the mBS.

The article, "Home NodeB Output Power," published by Ericsson, 3*GPP TSG Working Group* 4 *meeting* (available at http://www.3gpp.org/ftp/tsg_ran/WG4_Radio/TSGR4_43bis/Docs/), provides a power control scheme which reduces the femtocell transmit power as the distance between the macrocell BS and the femtocell BS increases. Under such an arrangement, the macrocell MSs experience better coverage as a result of reduced interference from the femtocell. However, this approach is questionable when a femtocell is either very close to or very far away from the macrocell BS.

The article, "Uplink User Capacity in a Multicell CDMA System with Hotspot Microcells," by S. Kishore, L. J. Greenstein, H. V. Poor, and S. C. Schwartz, published in *IEEE Trans. On Wireless Communications*, vol. 5, no. 6, pp. 1333-1342, June 2006, overcomes the near-far effect by increasing femtocell coverage. Increased femtocell coverage is achieved by allowing an MS close to a femtocell to communicate with the macrocell BS only when the signal quality from the macrocell BS is significantly better. This approach increases interference at neighboring femtocells.

The following patent application publications disclose femtocell implementations: (a) U.S. Patent Application Publication 2007/0183427, "Access Control in Radio Access Network Having Pico Base Stations," by T. Nylander et al., filed Oct. 3, 2006; (b) U.S. Patent Application Publication 2007/0254620, entitled "Dynamic Building of Monitored Set", by T. L. E. Lindqvist et al., filed Apr. 28, 2006; and (c) Internation Patent Application Publication WO2006/0139460, entitled "Method and Apparatus for Remote Monitoring of Femto Radio Base Stations", by J. Vikeberg et al., May 30, 2006. However, none of these patent applications offers an efficient frequency assignment scheme for a femtocell deployment.

SUMMARY OF THE INVENTION

Femtocells may increase the efficiency and coverage of macro cellular networks. Successful femtocell deployment depends on efficiently managing both interference among different femtocells and interference between a femtocell and a macrocell.

According to one embodiment of the present invention, an efficient frequency assignment scheme for femtocells is provided. The frequency assignment scheme reduces the interference between a femtocell and a macrocell and among different femtocells. Under this method, based on its location and where required, the femtocells perform spectrum-sensing and select suitable channels from a set of candidate channels. The method also provides an acceptable femtocell coverage area, even when the fBS is close to the mBS (i.e., as determined using a threshold). The frequency assignment scheme prefers sharing the frequency band of the macrocell network with the femtocells to take advantage of the desirable hand-off characteristics (i.e., the MS need not scan different frequency bands to search for cells). However, when the interference from the mBS exceeds a threshold, the assignment scheme requires the femtocell to use a different frequency band selected from a set of appropriate frequencies to ensure an acceptable femtocell coverage area. The frequency assignment scheme is applicable to various types of femtocells, such as the Home eNodeB and other personal BSs.

According to another embodiment of the present invention, the frequency assignment scheme may also provide joint power control and frequency allocation. Under this embodiment, the frequency assignment scheme is priority-based, such that the candidate frequency bands are selected depending on various parameters, such as the relative locations of the fBS and the mBS, path loss exponents and a frequency reuse factor (N). When the fBS is far away from the mBS, the fBS selects a frequency band from among those used by the mBS, and when the fBS is close to the mBS, a different frequency band is assigned to the fBS to achieve an acceptable coverage area. When the femtocell is located within a power control region, the transmission power of the femtocell is controlled to maintain a fixed coverage area for the femtocell. Among the femtocells, spectrum-sensing is used to select candidate frequency bands for use, in order to reduce interference among different femtocells.

The present invention is better understood upon consideration of the detailed description below in conjunction with the accompanying drawings.

DETAILED DESCRIPTION OF THE PREFERRED EMBODIMENTS

Figure 1:
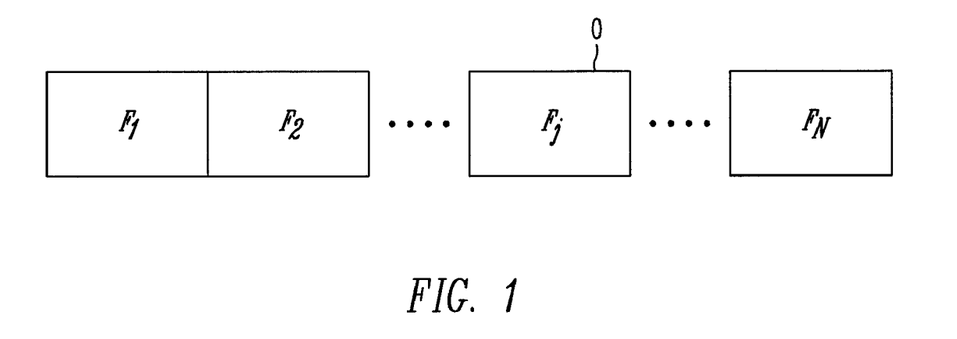
FIG. 1 illustrates a macrocell network that has a frequency reuse factor N>1.
Figure 2:
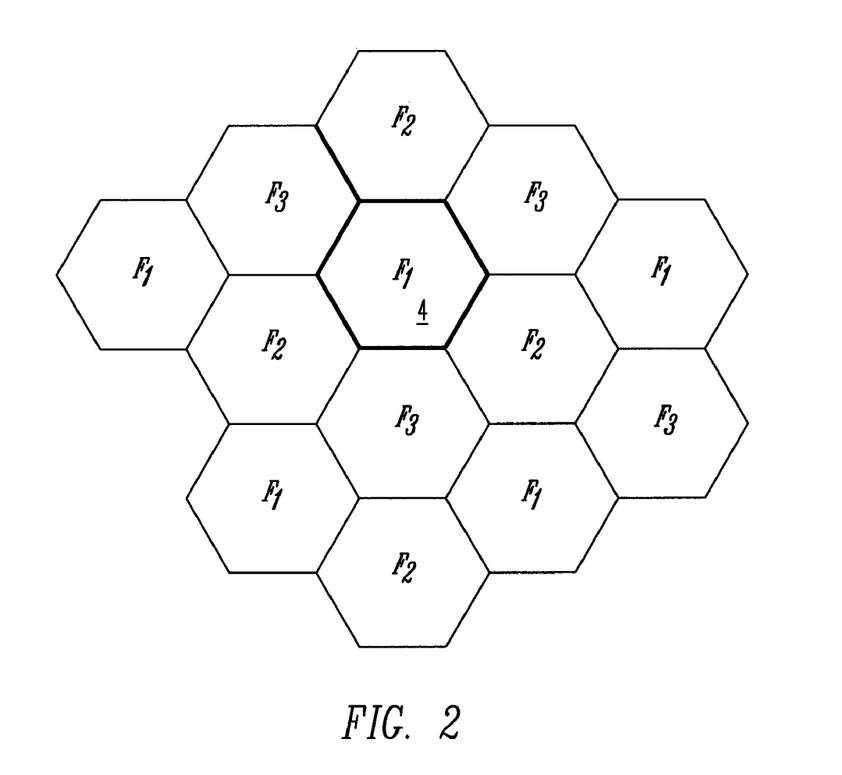
FIG. 2 illustrates a frequency band assignment for a network having a reuse factor N=3, where no neighboring macrocells use the same frequency band.

FIG. 1 illustrates a macrocell network 0 that has a frequency reuse factor N>1. In such a network, N frequency bands are assigned to the macrocells of the network, such that each macrocell is assigned a different frequency band than any of its neighboring macrocells. In the example of FIG. 1, without loss of generality, frequency band $F_i$ is assigned to macrocell 0. FIG. 2 illustrates a frequency band assignment for a network having reuse factor N=3, where no neighboring macrocells use the same frequency band. As shown in FIG. 2, macrocell 4, for example, is assigned frequency band $F_1$. Within each frequency band, the users may be further separated in time, frequency, or code domains. For example, in a wideband code division multiple access (WCDMA) network, each user in a macrocell is assigned a different CDMA code, selected from a set of CDMA codes, to minimize interference among users in the macrocell cell. There may be tens or even more femtocells within a macrocell.

Figure 3:
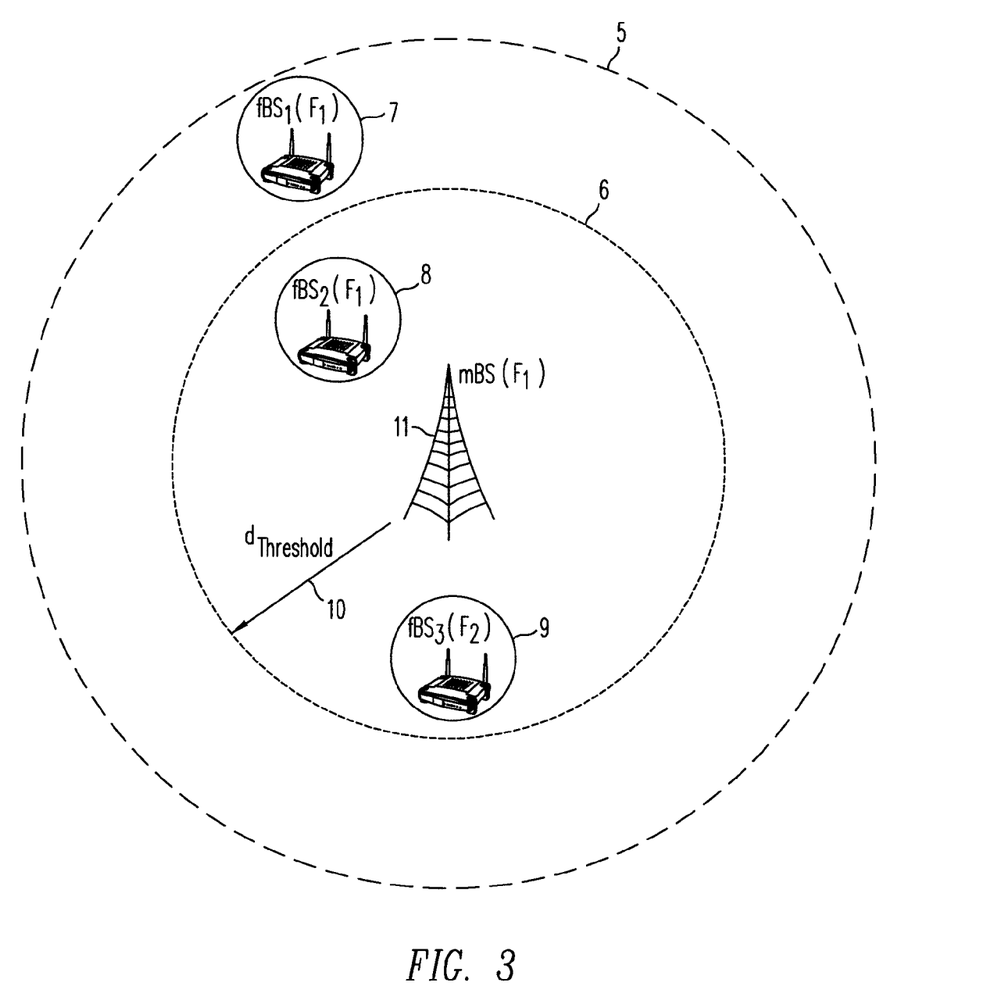
FIG. 3 shows a partition of the macrocell into two regions (i.e., an inner region and an outer region), in accordance with one embodiment of the present invention.

As discussed above, a co-channel implementation is preferable for a femtocell, from hand-off and cell search points of view. However, co-channel operation may not always be possible, due to interference from the mBS. FIG. 3 shows a partition of the macrocell into two regions (i.e., inner region 6 and outer region 7), in accordance with one embodiment of the present invention. Femtocells that are located in outer region 7 may use the same frequency band as one that is used in the macrocell network. For example, fBSs in outer region 7 and the mBS may both use frequency band $F_1$. Under such an arrangement, an MS can experience easier hand-off and cell search, when switching between the femtocell and the macrocell, as both cells use the same frequency band. Also, since the fBS is far away from the mBS, there is little interference from the mBS. Consequently, the fBS has a sufficiently large[1] coverage area.

[1] The coverage area is particularly sensitive to an interference-limited environment. If the interference is weak, i.e., a noise-limited environment, the coverage area would depend on the noise-floor. Interference is weak when the fBS is far away from the mBS. Where interference is strong, it is best to use a frequency band that is different from that of the macrocell.

For this detailed description, the coverage area of a fBS is defined for convenience sake by a contour along which the levels of the received power from the fBS and from the mBS are the same. The present invention is, however, is not limited by this convention. The present invention is applicable to situations where the coverage area may be defined in other ways. For example, the coverage area may be defined by a hand-off parameter, such as the cell search initiation threshold or the hand-off execution threshold. In such a case, the received power levels from the fBS and from the mBS may not be the same. Also, in such other cases, there may be more than one contour that defines the coverage area (e.g., a contour for an incoming user to the fBS, and another contour for an outgoing user from the fBS).

Referring to FIG. 3, for fBSs that are located within inner region 6, the power level received from the mBS is high. Therefore, if these fBSs use the same frequency band as the mBS, their respective coverage areas are small, such as illustrated by $fBS_2$ in femtocell coverage area 8. For a reuse factor N>1, the femtocell may use one of the other N−1 bands, that are used by other macrocells and not the current macrocell. For example, $fBS_3$ uses frequency band $F_2$, which is an orthogonal channel to frequency band $F_1$. As interference from other macrocells is expected to be minimal, the coverage area for the femtocell $fBS_3$ may be kept sufficiently large.

Figure 4:
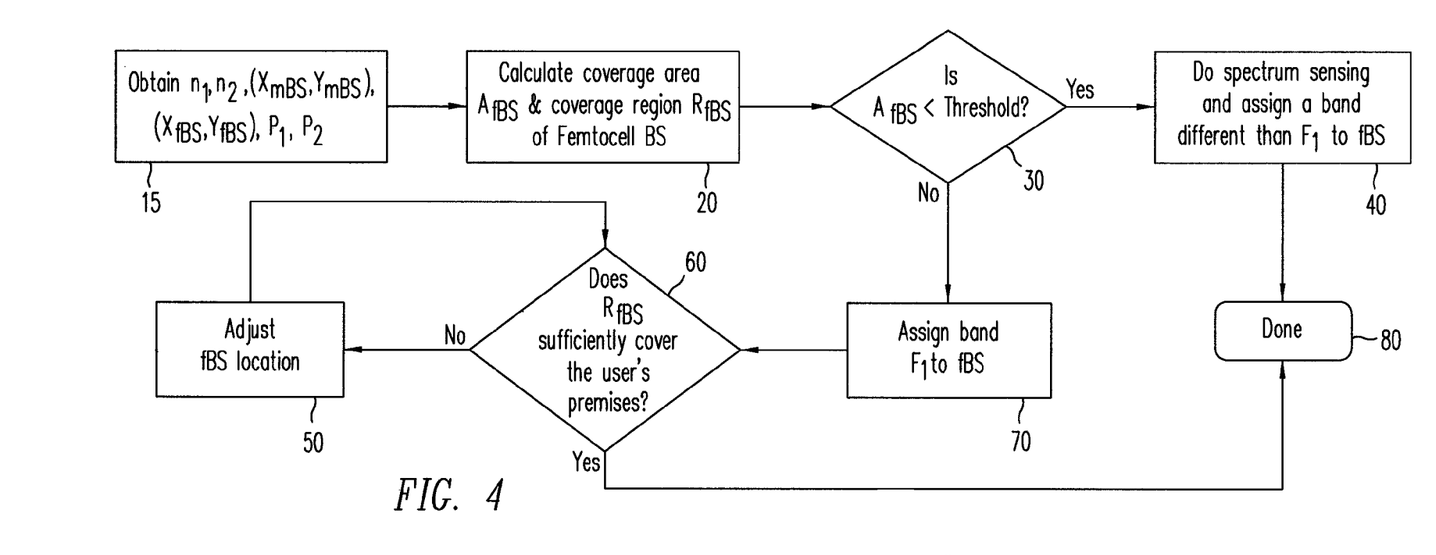
FIG. 4 is a flow chart illustrating in greater detail a frequency assignment framework according to one embodiment of the present invention.

FIG. 4 is a flow chart that illustrates in greater detail a frequency assignment framework according to one embodiment of the present invention. In FIG. 4, $n_1$ denotes the path loss exponent (PLE) between an MS and the mBS, $n_2$ denote the PLE between an MS and the fBS, $P_1$ denote the received signal power from the mBS at an MS, and $P_2$ denote the received signal power from the fBS at an MS. Also, ($x_{mBS}$, $y_{mBS}$) and ($x_{fBS}$, $y_{fBS}$) denote the geographical locations of the mBS and the fBS, respectively[2]. The values of these parameters are measured at step 15. At step 20, as the SINR is 0 dB at the border of a femtocell coverage area (under co-channel implementation), the femtocell coverage area may be calculated algebraically. One method for calculating femtocell coverage area is discussed in further detail below[3,4]. Coverage area $A_{fBS}$ of a co-channel femtocell preferably covers completely a user's premises. At step 30, coverage area $A_{fBS}$ is compared to a threshold value. If the coverage area is greater than the threshold value, the femtocell can operate in a co-channel manner with the macrocell. Otherwise, i.e., if the coverage area $A_{fBS}$ is less than the threshold value, severe interference is experienced, and the femtocell should select a different frequency band. While the threshold value may be based only on coverage area considerations, it can also take into account other parameter values, such as the monthly subscription fee charged to the user pays, or a QoS requirement, and other interference considerations.

[2] The relative locations of the two BSs with respect to each other provide the distance between them.

[3] The path loss exponents may be obtained from prior measurements performed in the same environment. Alternatively, it may be possible to obtain them on the fly. For example, the mBS may inform the fBS about its transmission power during femtocell initialization. The fBS may then estimate the path loss exponent from the mBS using the known distance between itself and the mBS. A position estimate of the location of the fBS may be obtained using any of several ways, such as GPS, triangulation, utilization of TV signals for position finding, or the a-priori information regarding the home's geographic location.
[4]See, also, the article "Co-Channel Femtocell Coverage Area Analysis", by Ismail Guvenc, Moo-Ryong Jeong, and Fujio Watanabe, IEEE Commun. Lett., Volume 12, Issue 12, December 2008, Page(s):880-882.

Figure 6:
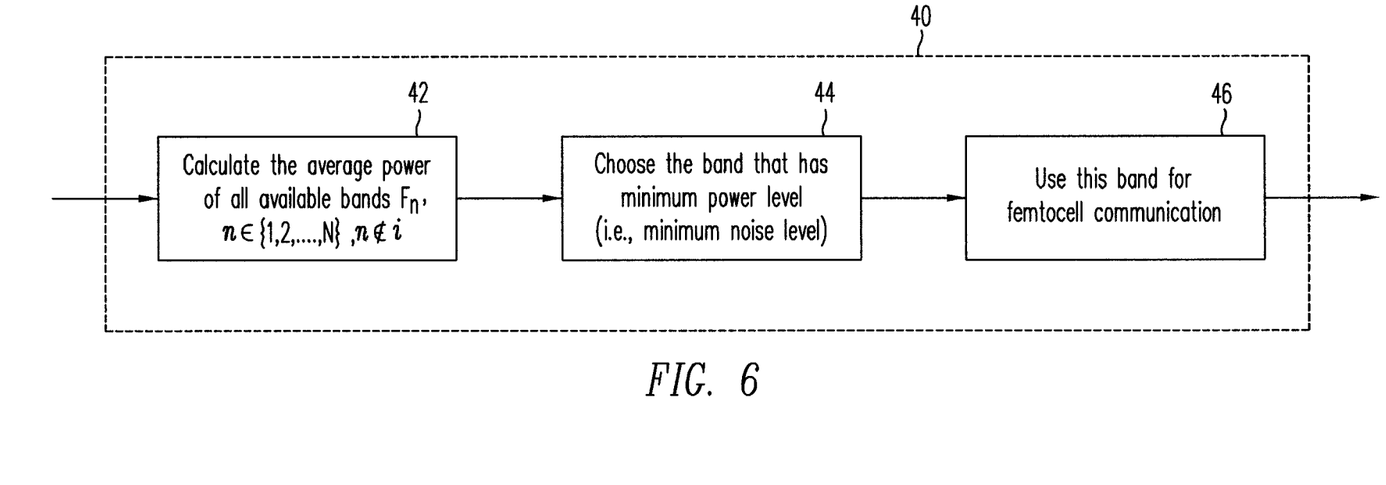
FIG. 6 illustrates a spectrum scanning technique, according to one embodiment of the present invention.

At step 40, when coverage area $A_{fBS}$ is less than the threshold value, the fBS should choose one of the N−1 frequency bands that is different than $F_i$. To minimize interference with other femtocells, the femtocell preferably first scans the N−1 frequency bands. FIG. 6 illustrates a spectrum scanning technique that may be used to implement step 40, according to one embodiment of the present invention. As shown in FIG. 6, at step 42, the power levels in the N−1 frequency bands are determined using, for example, an energy detection technique. Then, at step 44, the frequency band that has the least noise level is chosen. The chosen frequency band is then used for communication in the femtocell (step 46). A large N provides a lesser inter-femtocell interference, as there are more candidate frequency bands to choose from.

In addition to the coverage area $A_{fBS}$ of a fBS, an approximate region of coverage $R_{fBS}$ may also be determined algebraically, as described in further detail below. Frequently, region $R_{fBS}$ may be approximated by a circle, with the center of this circle being collinear with the locations of the fBS and the mBS, and further away from the mBS relative to the fBS. The distance between the center of the circle of region $R_{fBS}$ and the fBS location depends on such parameters as the path loss exponent and the transmission powers of the fBS and the mBS. Referring back to FIG. 4, the coverage region $R_{fBS}$ for a given placement of an fBS provides a rough yardstick for determining if coverage area $A_{fBS}$ completely covers the user's premises (step 60). If not, i.e., coverage area $A_{fBS}$ does not completely covers the user's premises, the placement of the fBS may be adjusted to improve coverage (step 50). Steps 50 and 60 may be iterated to achieve an optimal placement of the fBS.

Figure 5:
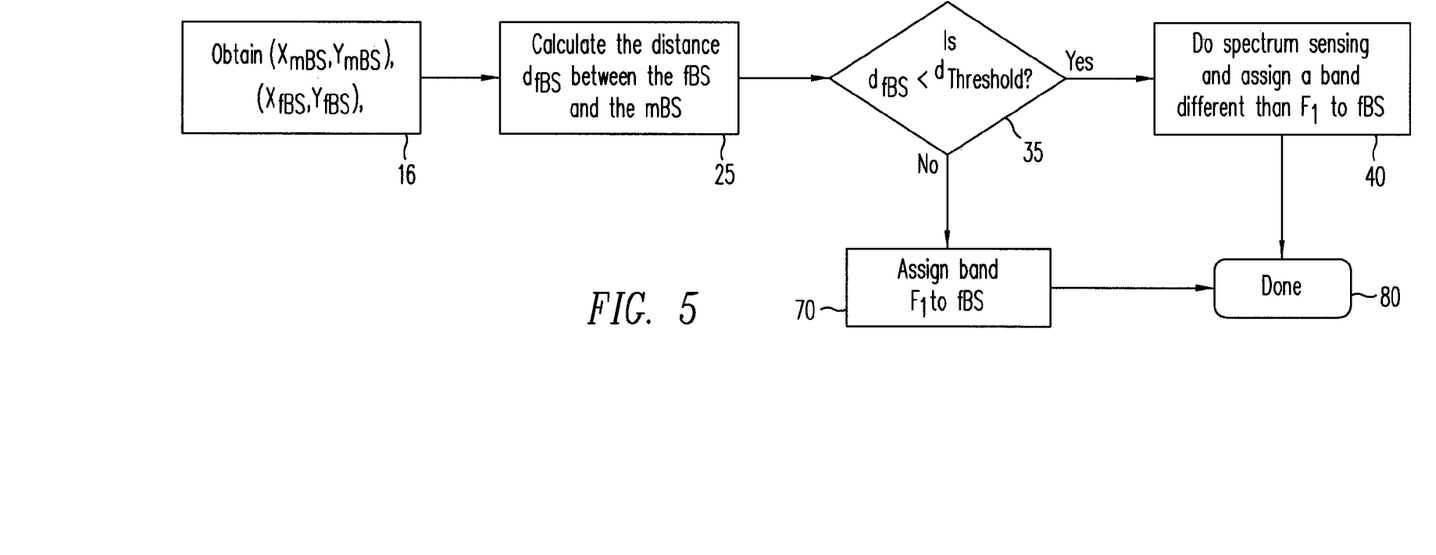
FIG. 5 is a flow chart illustrating another femtocell frequency assignment framework, according to a second embodiment of the present invention.

FIG. 5 is a flow chart illustrating another femtocell frequency assignment method, according to a second embodiment of the present invention. At step 16, the respective geographical locations ($x_{mBS}$, $y_{mBS}$) and ($x_{fBS}$, $y_{fBS}$) of the mBS and the fBS are determined. At step 25, the distance $d_{fBS}$ between the fBS and the mBS is determined from these geographical locations. Under this framework, knowledge of the path-loss exponents and the transmission powers of the mBS and fBS are not required. Instead, the distance $d_{fBS}$ is used to determine if the fBS lies within or outside of the border (a threshold value) between inner region 6 and outer region 7 of the macrocell (step 35). If distance $d_{fBS}$ is greater than the threshold value, the femtocell uses frequency band $F_i$ (step 70). Otherwise, at step 40 (see details in FIG. 6), the femtocell selects the one of the other N−1 frequency bands having the minimum noise level.

Figure 7:
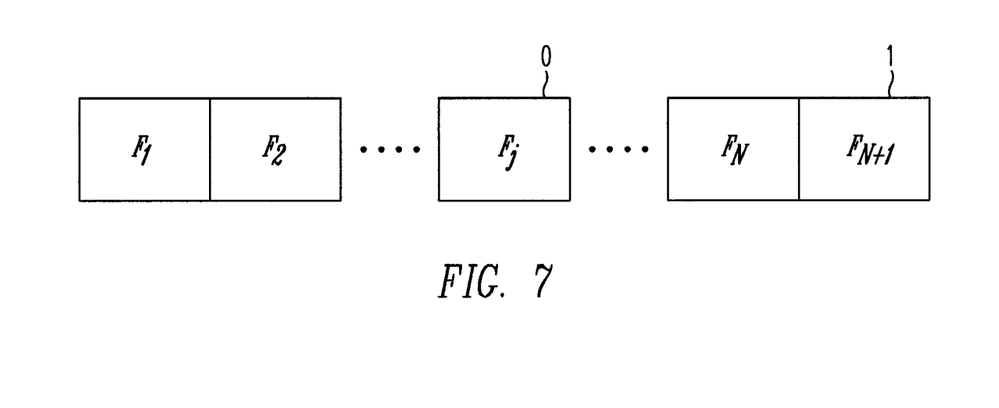
FIG. 7 shows yet another frequency band assignment framework, in accordance with one embodiment of the present invention.

FIG. 7 shows yet another frequency band assignment framework, in accordance with one embodiment of the present invention. As shown in FIG. 7, in a network where the macrocells have a reuse factor of N, a separate frequency band $F_{N+1}$ is assigned for use by all of the fBSs within a macrocell. In this way, interference from the current mBS and any of the surrounding mBSs are avoided. However, because the fBSs uses a different frequency band from the serving mBS, hand-off process is less efficient.

According to yet another frequency band assignment framework, during an initialization step of the femtocell, an MS or the femtocell fBS may measure the received signal strength and report the received signal strength to the mBS. The mBS may then determine if the fBS belongs to inner region 6 or outer region 7, and report the determination to the fBS. Frequency band assignment may then proceed along any of the schemes discussed above based on the geographical region determination.

For an mBS located at $x_1=(x_1; y_1)$, with transmit power $P_1$, and an fBS located at $x_2=(x_2; y_2)$, with transmit power $P_2$, under an empirical path loss model, the power of a signal transmitted from an mBS and received at an MS is given by $$P_{r,1}=P_1 P_o(d_o/d)^n, \quad (1)$$

where $P_o$ is is the measured path loss at a reference distance $d_o$ (typically, $P_0$ may be approximated by $(4\pi/\lambda)^2$ for $d_o=1$, with $\lambda$ denoting the wavelength of the signal) and n is the path loss exponent. Because the signal-to-interference ratio (SIR) is assumed to be 0 dB at the border of a co-channel femtocell, without loss of generality, Po is the same for both the fBS and the mBS at a distance $d_o=1$, so that:

$$\frac{P_1}{d_1^n} = \frac{P_2}{d_2^n}. \quad (2)$$

Thus, in a system in which n=2, the coordinates x=(x; y) of the points on the border of the femtocell satisfy:

$$d_j^2=(x-x_j)^2+(y-y_j)^2, j\in\{1, 2\}. \quad (3)$$

Combining equations (3) and (2), one obtains:

$$x^2 + y^2 + \frac{B_1}{A}x + \frac{B_2}{A}y + \frac{C}{A} = 0, \quad (4)$$

where $$A = P_1 - P_2, \quad (5)$$

$$B_1 = 2P_2 x_1 - 2P_1 x_2, \quad (6)$$

$$B_2 = 2P_2 y_1 - 2P_1 y_2, \quad (7)$$

$$C = P_1 x_2^2 + P_1 y_2^2 - P_2 x_1^2 - P_2 y_1^2. \quad (8)$$

Equation (4) is in the form of a circle of radius r which is centered at $k=(k_1; k_2)$, i.e., $$x^2+y^2-2k_1 x-2k_2 y+k_1^2+k_2^2-r^2=0. \quad (9)$$

Therefore, comparing equations (9) and (4), the center point $k=(k_1; k_2)$, representing the center of femtocell coverage area, is $$k_1 = -\frac{B_1}{2A}, k_2 = -\frac{B_2}{2A},$$

which may also be expressed in vector form as:

$$k = \frac{P_2}{P_1 - P_2}x_1 - \frac{P_1}{P_1 - P_2}x_2. \quad (10)$$

The radius r is given by:

$$r = \sqrt{k_1^2 + k_2^2 - \frac{C}{A}} = \sqrt{\frac{B_1^2}{4A^2} + \frac{B_2^2}{4A^2} - \frac{C}{A}}. \quad (11)$$

Then, the femtocell coverage area is:

$$A_{fem} = \pi r^2 = \pi\left(\frac{B_1^2}{4A^2} + \frac{B_2^2}{4A^2} - \frac{C}{A}\right). \quad (12)$$

Equation (12) shows that the femtocell coverage area depends on both the locations of the mBS and the fBS, and their respective transmit powers.

For $n \neq 2$ (i.e., for any arbitrary path loss exponent), taking the $(2/n)$-th root of both sides of equation (2) provides:

$$\frac{P_1^{2/n}}{d_1^2} = \frac{P_2^{2/n}}{d_2^2}, \quad (13)$$

which is equivalent to the scenario with n=2 above, but characterized by a different set of transmit powers. The center of coverage and the area of coverage may be derived using the same procedure illustrated above with respect to equations (10) and (12), substituting $(P_1)^{2/n}$ for $P_1$ and $(P_2)^{2/n}$ for $P_2$.

In general, the path loss exponents at the fBS and mBS are different (i.e., $P_o$ is not the same for both the fBS and the mBS at a distance $d_o=1$). In that case, rather than equation (2):

$$\frac{P_1}{d_1^{n_1}} = \frac{P_2}{d_2^{n_2}}. \quad (14)$$

Because the mBS is typically located at a higher altitude (e.g., on a cell tower), the power loss exponents may satisfy $n_1 < n_2$. Taking the $(2/n_2)$-th root of both sides of equation (14), one obtains:

$$\frac{P_1^{2/n_2}}{d_1^{2n_1/n_2}} - \frac{P_2^{2/n_2}}{d_2^2} = 0, \quad (15)$$

The assumption that the signal-to-interference ratio (SIR) is 0 dB at the border of a co-channel femtocell results in:

$$P_2^{2/n_2}(x^2+y^2-2xx_1-2yy_1+x_1^2+y_1^2)^{n_1/n_2} - P_1^{2/n_2}(x^2+y^2 - 2xx_2-2yy_2+x_2^2+y_2^2) = 0, \quad (16)$$

where $0 < n_1/n_2 < 1$. In equation (16), the highest power of both the x and y terms is 2. Equation (16) may be simplified by approximating $d^{2n_1/n_2}=1$, and evaluating equation (16) at a point (a; b), using a second-order Taylor series (Point (a;b) may be approximated by $(x_1;x_2)$ in most cases):

$$T(x,y) = \quad (17)$$
$$f(a,b) + (x-a)f_x(a,b) + (y-b)f_y(a,b) + 0.5[(x-a)^2 f_{xx}(a,b) + 2(x-a)(y-b)f_{xy}(a,b) + (y-b)^2 f_{yy}(a,b)],$$

where $$f(a,b) = (a^2+b^2-2ax_1-2by_1+x_1^2+y_1^2)^{n_1/n_2} \quad (18)$$

$$f_x(a,b) = \frac{2n_1}{n_2}(a-x_1)[f(a,b)]^{\frac{n_1}{n_2}-1} \quad (19)$$

$$f_y(a,b) = \frac{2n_1}{n_2}(b-y_1)[f(a,b)]^{\frac{n_1}{n_2}-1} \quad (20)$$

-continued $$f_{xx}(a,b) = \frac{2n_1}{n_2}[f(a,b)]^{\frac{n_1}{n_2}-1} + \frac{4n_1}{n_2}\left(\frac{n_1}{n_2}-1\right)(a-x_1)^2[f(a,b)]^{\frac{n_1}{n_2}-2} \quad (21)$$

$$f_{yy}(a,b) = \frac{2n_1}{n_2}[f(a,b)]^{\frac{n_1}{n_2}-1} + \frac{4n_1}{n_2}\left(\frac{n_1}{n_2}-1\right)(b-y_1)^2[f(a,b)]^{\frac{n_1}{n_2}-2} \quad (22)$$

$$f_{xy}(a,b) = \frac{4n_1}{n_2}\left(\frac{n_1}{n_2}-1\right)(a-x_1)(b-y_1)[f(a,b)]^{\frac{n_1}{n_2}-2}. \quad (23)$$

Then, using the result of equation (17) in equation (16), one obtains:

$$\tilde{A}_1 x^2 + \tilde{A}_2 y^2 + \tilde{B}_1 x + \tilde{B}_2 y + \tilde{B}_3 xy + C = 0, \quad (24)$$

where $$\tilde{A}_1 = \frac{1}{2}P_2^{2/n_2}f_{xx}(a,b) - P_1^{2/n_1} \quad (25)$$

$$\tilde{A}_2 = \frac{1}{2}P_2^{2/n_2}f_{yy}(a,b) - P_1^{2/n_1} \quad (26)$$

$$\tilde{B}_1 = P_2^{2/n_2}[f_x(a,b) - af_{xx}(a,b) - bf_{xy}(a,b)] - 2P_1^{2/n_1}x_2 \quad (27)$$

$$\tilde{B}_2 = P_2^{2/n_2}[f_y(a,b) - bf_{yy}(a,b) - af_{xy}(a,b)] - 2P_1^{2/n_1}y_2 \quad (28)$$

$$\tilde{B}_3 = 2P_2^{2/n_2}f_{xy}(a,b) \quad (29)$$

$$\tilde{C} = P_2^{2/n_2}\begin{bmatrix} f(a,b) - af_x(a,b) - bf_y(a,b) + 0.5a^2 f_{xx}(a,b) + \\ 0.5b^2 f_{yy}(a,b) + abf_{xy}(a,b) \end{bmatrix} - \\ P_1^{2/n_1}(x_2^2+y_2^2). \quad (30)$$

Equation (24) resembles the circle of equation (4), except for: 1) the xy cross-terms, so that the coverage area is an ellipse, rather than a circle, and 2) the coefficients for $x_2$ and $y_2$ are different. If $P_2 \ll P_1$, one may set $\tilde{A}_1 \approx \tilde{A}_2$, and $\tilde{B}_3 \approx 0$ (i.e., once again approximating the coverage area by a circle). With this simplification, the coordinates at the center of the coverage area, and the area of the coverage area, can be obtained using the procedures discussed above with respect to equations (10) and (12), using equations (25)-(30).

Because spectrum resources are scarce, small frequency reuse factors are preferable. Thus, a frequency reuse factor of N=1 may be preferable in many future wireless systems. In such a system, femtocells may have to use the same frequency band as the macrocell in all locations within the macrocell coverage area. However, as discussed above, when an fBS is very close to the mBS, the femtocell experiences severe interference from the mBS. Interference averaging techniques, such as those discussed in Chandrasekhar (above) may be used to mitigate the interference. Such techniques have inherent disadvantages, and may also not be sufficient to overcome the interference in femtocells at close proximities to the mBS.

Figure 8:
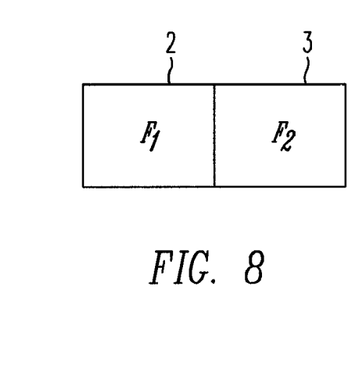
FIG. 8 shows, for N=1, another frequency assignment scheme which assigns a separate frequency band to each femtocell, according to one embodiment of the present invention.

FIG. 8 shows, for N=1, another frequency assignment scheme which assigns a separate frequency band $F_2$ to all the femtocells in a macrocell network using frequency band $F_1$, according to one embodiment of the present invention. The system of FIG. 8 ensures interference-free operation among the femtocells and the macrocell, at the expense of additional spectrum resources. Also, when available, more than one frequency band may be assigned for femtocell operations to reduce inter-femtocell interference, using a spectrum-sensing approach, such as described for step 40 of FIGS. 4-6.

The scenarios discussed above are applicable to downlink channel assignments. The interference for the uplink may be different, and a different channel assignment scheme may be needed for duplex operation. For example, a macrocell MS (mMS) may need a larger transmit power to reach the mBS, when the MS is far away from the mBS. Hence, when the femtocell is located within outer region 7, as far as the uplink operation is concerned, the interference from an mMS to the femtocell may be more significant, when the femtocell and the mMS both use the same channels for communication. Thus, to avoid interference between the mMS and the femtocell, different channels are preferably assigned to the mMS and femtocell in outer region 7. Within inner region 6, because the mMS uses weaker signals to communicate with the mBS, co-channel operation with the femtocell may be possible.

Figure 9:
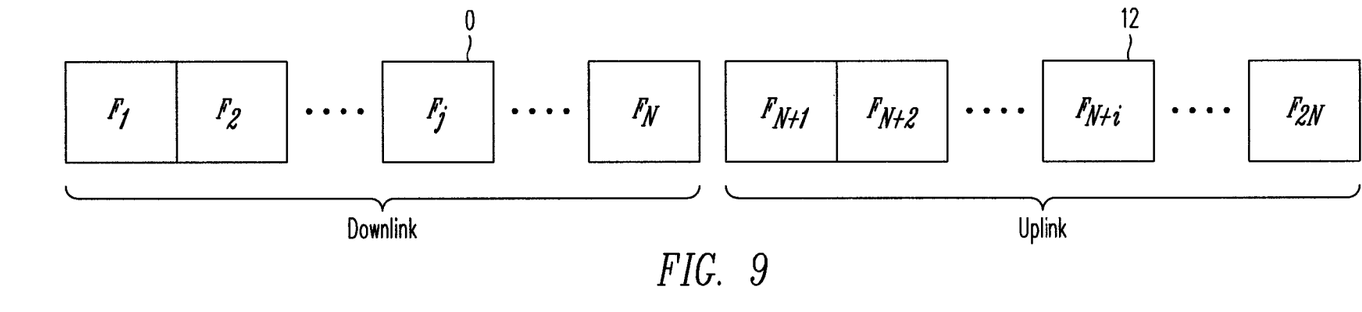
FIG. 9 shows a frequency division duplex (FDD) frequency assignment scheme for a macrocell network, in accordance with one embodiment of the present invention.
Figure 10:
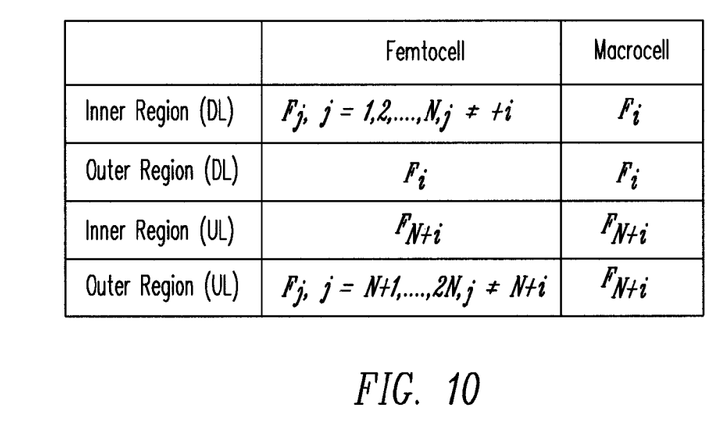
FIG. 10 shows an example of an actual FDD frequency assignment in a network of the type discussed with respect to FIG. 9, according to one embodiment of the present invention.

FIG. 9 shows a frequency division duplex (FDD) frequency assignment scheme for a macrocell network, in accordance with one embodiment of the present invention. As shown in FIG. 9, the macrocell uses frequency band 0 (i.e., frequency band $F_i$) in the downlink, and frequency band 12 (i.e., frequency band $F_{N+i}$) in the uplink. In such a network, the frequency band assigned to the femtocell depends on both 1) whether or not the femtocell is within inner region 6 or outer region 7, and 2) whether or not the communication is downlink or uplink. FIG. 10 shows an example of an actual FDD frequency assignment in a network of the type discussed with respect to FIG. 9, according to one embodiment of the present invention. The downlink frequency assignment may be achieved using the methods in FIGS. 4-8. For the uplink, when the femtocell is within inner region 6, the same frequency band is used for the femtocell as the macrocell (i.e., frequency band $F_{N+i}$). Otherwise, i.e., if the femtocell is in outer region 7, a different frequency band than frequency band $F_{N+i}$ is used to avoid interference to or from the mMS that are far away from the mBS.

According to another aspect of the present invention, power control and frequency assignment may be carried out simultaneously ("joint power control and frequency assignment"). The macrocell network of FIG. 9 above may be used to illustrate such an approach, for the case where the frequency reuse factor of N>1. In such a network, N downlink frequency bands and N uplink frequency bands are used, with each frequency band being assigned to a different macrocell. In the following detailed description, downlink operation is first discussed. Without loss of generality, frequency band 0 (i.e., frequency band $F_i$) is assigned to the macrocell of interest. For N=3, which is illustrated above in FIG. 2, where no neighboring macrocells use the same frequency band, and the macrocell of interest uses frequency band 4 (i.e., frequency band $F_1$). As explained above, within each frequency band, users may also be further separated in time, frequency, or code domains. For example, in a wideband code division multiple access (WCDMA) system, multiple CDMA codes are used to minimize interference among the different users within a macrocell.

Figure 11:
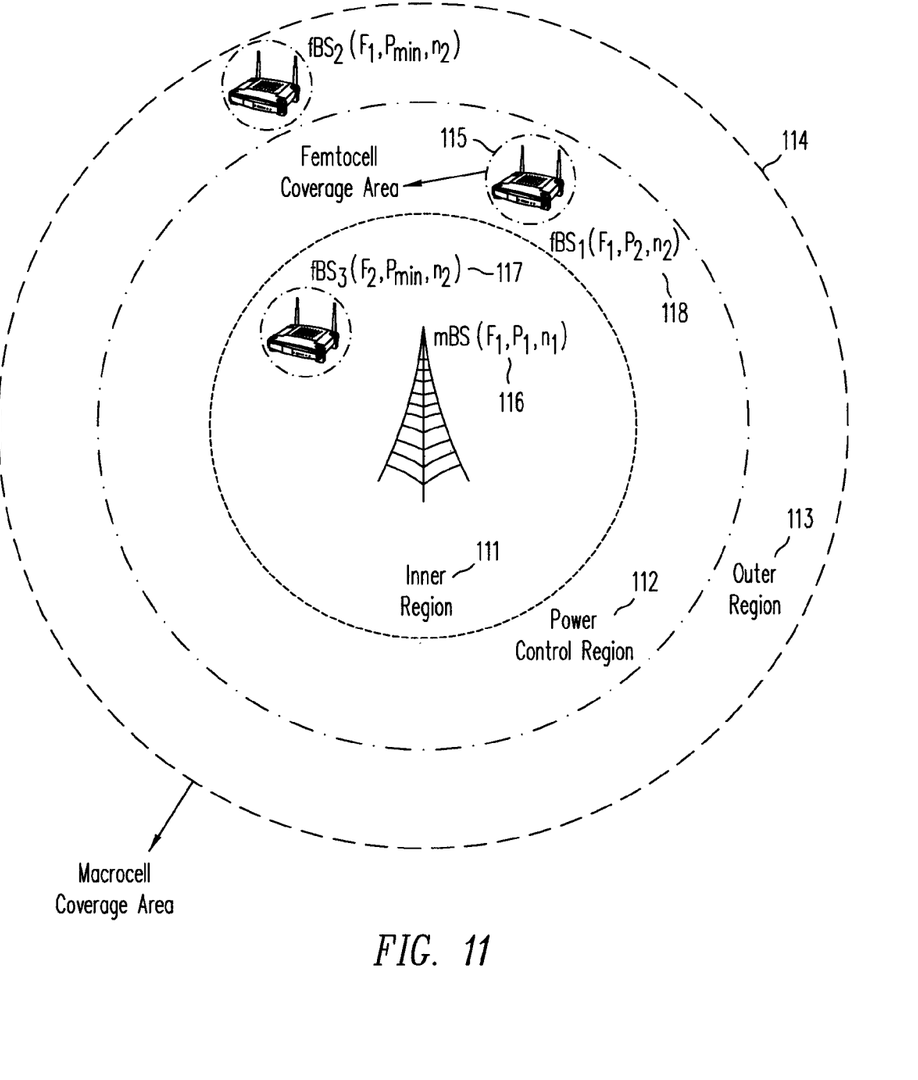
FIG. 11 illustrates a network implementing joint power control and frequency assignment, in accordance with one embodiment of the present invention.

To provide joint power control and frequency assignment, a method according to the present invention follows the following criteria: (a) co-channel operation of the femtocell is preferable from cell-search and hand-off points of view, subject to the interference conditions from the mBS; (b) in all cases, the femtocell guarantees a minimum coverage area $A_{fem}$ through power control; and (c) the femtocell has a maximum transmission power limit $P_{max}$ and a minimum transmission power limit $P_{min}$. Power limit $P_{max}$ may represent hardware constraints or interference constraints among femtocells, while power limit $P_{min}$ may be the minimum transmission power needed for good coverage, in the absence of any interference. FIG. 11 illustrates a network implementing joint power control and frequency assignment, in accordance with one embodiment of the present invention. As shown in FIG. 11, the macrocell is partitioned into inner region 111, power control region 112, and outer region 113. While no power control is applied in inner and outer regions, the fBS uses power control in power-control region 112 to provide a pre-determined femtocell coverage area $A_{fem}$.

As discussed above, the coverage area of the fBS is determined by the area within a contour along which the received power levels (typically, for the pilot signals, rather than the data signals) from the fBS and mBS are the same. The present invention, however, is equally applicable to systems in which the coverage areas are defined in other ways, such as hand-off parameters. Such hand-off parameters may include, for example, cell search initiation threshold and handoff execuation threshold. In such cases, the received power levels from the fBS and mBS may not be the same, and there may be more than one contour that defines the coverage area (e.g., one contour for an incoming user to the fBS and another contour for an outgoing user from the fBS).

Figure 12:
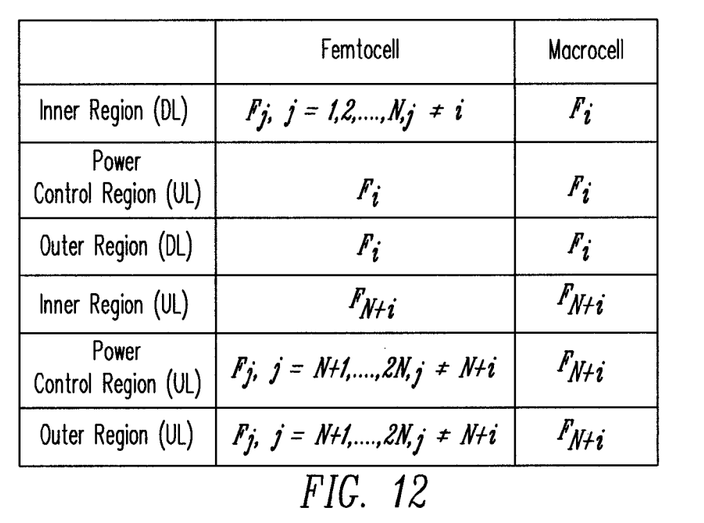
FIG. 12 provides an example of frequency band assignments in the regions of FIG. 11, for both downlink and uplink frequency assignments, in accordance with one embodiment of the present invention.

FIG. 12 provides an example of frequency band assignments in the regions of FIG. 11, for both downlink and uplink frequency assignments, in accordance with one embodiment of the present invention. As shown in FIG. 12, during downlink transmission, macrocell uses frequency band $F_i$ in all three regions. The frequency band used for downlink by a femtocell, however, depends on which region the fBS is located: (a) when the femtocell is in power control region 112, or in outer region 113, the femtocell uses the same frequency band as the macrocell (i.e., $F_i$.); and (b) when the femtocell is within inner region 111 (i.e., when interference from the mBS is high), the fBS uses a frequency band different than that used by the macrocell (e.g., a frequency band used by one of the neighboring macrocells, or a frequency band specifically reserved for femtocells).

Figure 13:
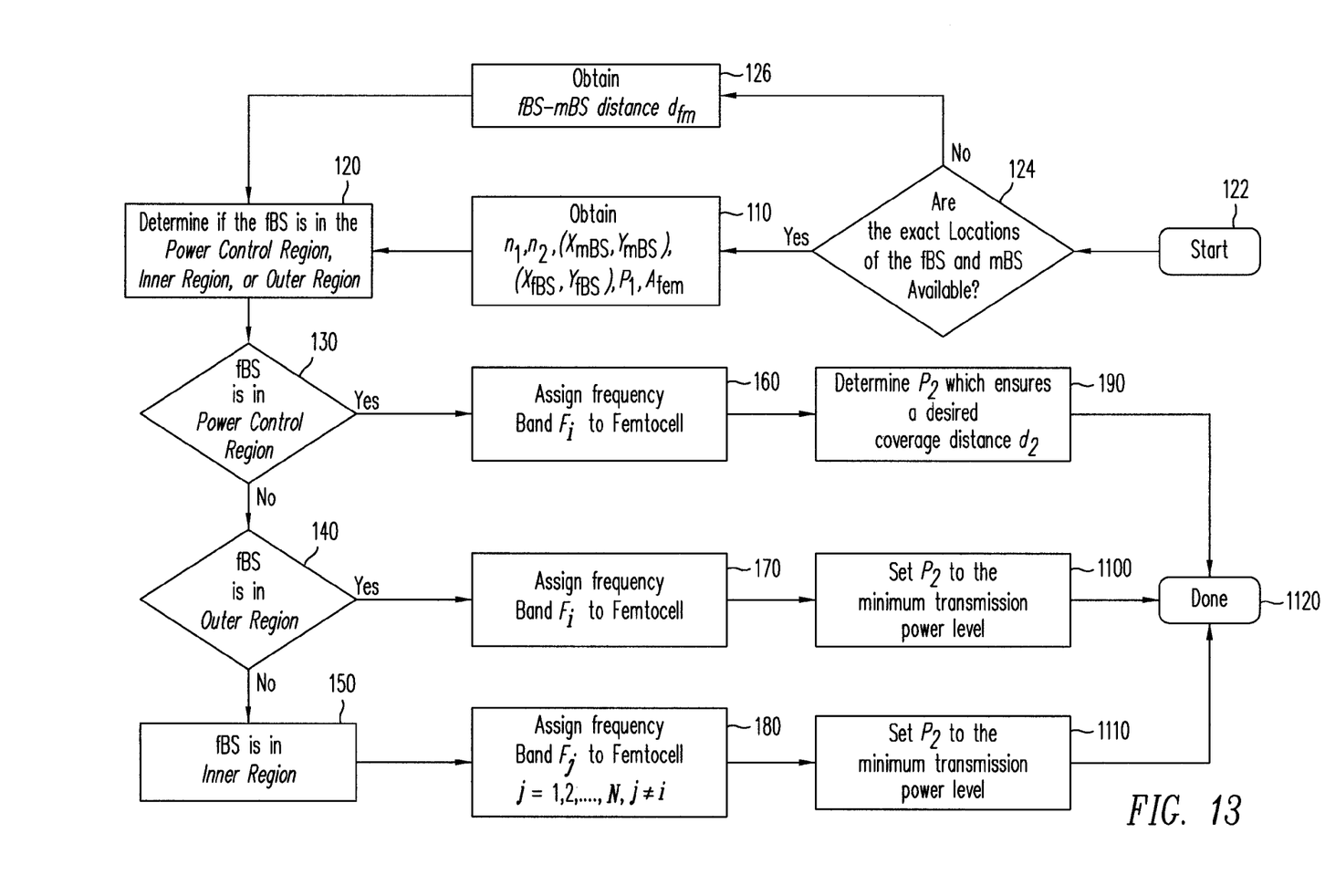
FIG. 13 is a block diagram illustrating joint power control and frequency band assignment in the regions of FIG. 11, in accordance with one embodiment of the present invention.

FIG. 13 is a block diagram illustrating joint power control and frequency band assignment in the regions of FIG. 11, in accordance with one embodiment of the present invention. In FIG. 13, if the locations of the fBS and the mBS are available (step 124), a fBS obtains at step 110 (a) $n_1$ and n2, which denote the path loss exponents for the mBS and the fBS, respectively; (b) $P_1$ and $P_2$, which denote the transmission powers for the mBS and fBS, respectively; and (c) ($x_{mBS}$, $y_{mBS}$) and ($x_{fBS}$, $y_{fBS}$), which denote the locations of the mBS and the fBS, respectively. Otherwise, i.e., the locations of the fBS and the mBS are not available, distance $d_{fm}$ between an fBS and mBS is obtained at step 126. At step 120, using the information obtained in either step 126 or step 110, the fBS determines if it is in inner region 111, power control region 112, or outer region 113. If the fBS is in power control region 112, at step 60, the femtocell is assigned the same frequency band as the macrocell (i.e., frequency band $F_i$ for downlink operations). In power control region 112, at step 190, the fBS selects a power level $P_2$ which ensures that coverage area $A_{fem}$ is achieved, in the presence of macrocell interference. If the fBS determines that it is in outer region 113, at step 170, the same frequency band as the macrocell is assigned to femtocell (i.e., frequency band $F_i$ for downlink operations) (i.e., frequency band $F_i$ for downlink operations). In outer region 113, even though interference by the mBS to the femtocell is low, a low transmission power may result in unsatisfactory performance. Therefore, at step 1100, a fixed minimum transmission power $P_{min}$ is selected for the fBS. If the femtocell is determined to be in neither power control region 112, nor outer region 113 (i.e., fBS is in inner region 111), at step 150, a frequency band which is orthogonal to the macrocell frequency band is assigned to the femtocell. Under such an assignment, interference from the macrocell is insignificant. Thus, in inner region 111, the femtocell may also select at step 1110 a fixed transmission power $P_{min}$ for communication. A larger fixed transmission power may be used to overcome interference from neighboring macrocells or other femtocells.

Figure 14:
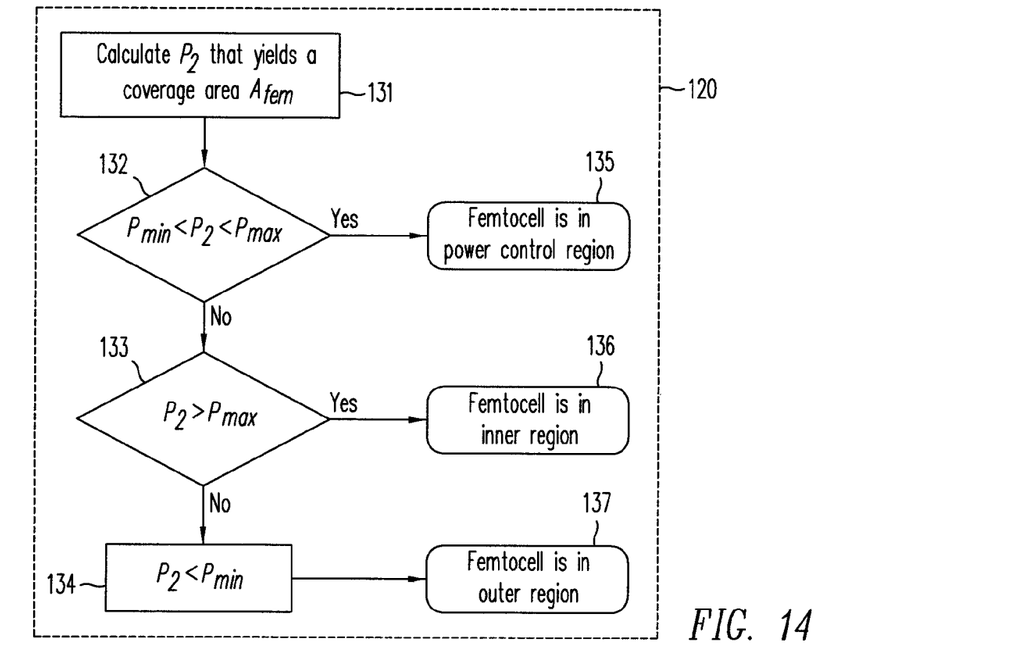
FIG. 14 is a block diagram illustrating a first approach the fBS may use to determine the region of its location, in accordance with one embodiment of the present invention.
Figure 15:
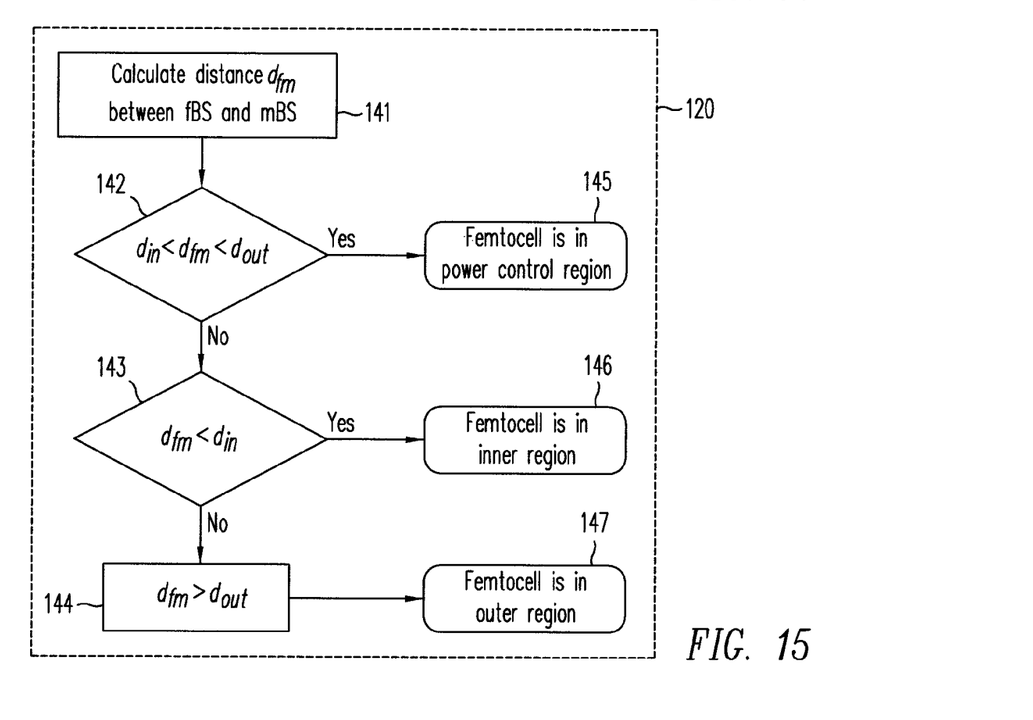
FIG. 15 is a block diagram illustrating a second approach the fBS may use to determine the region of its location, in accordance with one embodiment of the present invention.

FIGS. 14 and 15 are block diagrams illustrating different approaches the fBS may use to decide the region of its location (i.e., step 120 of FIG. 13), in accordance with one embodiment of the present invention. In FIG. 14, at step 131, a femtocell calculates a transmission power $P_2$ required to obtain a coverage area $A_{fem}$. Some examples of such a calculation is discussed in further detail below. Then, at step 132, the calculated power level $P_2$ is compared to power thresholds $P_{min}$ and $P_{max}$ discussed above. If $P_{min} < P_2 < P_{max}$ (step 135), the femtocell is in power control region 112. Otherwise, if $P_2 > P_{max}$ (step 133), the femtocell is in inner region 111 (step 136), and if $P_2 < P_{min}$ (step 134), the femtocell is in outer region 113 (step 137). In the method of FIG. 14, the power level at step 131 may be calculated using the parameters $n_1$, $n_2$, $P_1$, $A_{fem}$, and the locations of the fBS and mBS (i.e., step 110 of FIG. 13), or the distance between the fBS and the mBS (i.e., step 126 of FIG. 13) and other remaining parameters.

FIG. 15 shows a simpler approach by which the femtocell can determine the region of its location. In the method of FIG. 15, only distance $d_{fm}$ to the mBS, calculated at step 141, is used to decide whether it is in inner region 111, power control region 112, or outer region 113 (i.e., the parameters $n_1$, $n_2$, $P_1$, $A_{fem}$ are not utilized). At step 142, if $d_{in} < d_{fm} < d_{out}$, where $d_{in}$ and $d_{out}$, are the radii of inner region 111 and outer region 13, respectively, the femtocell is determined to be in power control region 112 (step 145). Otherwise, if $d_{fm} > d_{out}$ (step 143), the femtocell is determined to be in outer region 113, while if $d_{fm} < d_{in}$ (step 144), the femtocell is determined to be in inner region 111 (step 147).

In one implementation of a method of the present invention, where the coverage area $A_{fem}$ may not be available, but the total coverage area of a user's premises may be classified into K premise types (e.g., a studio, small apartment, large apartment, house, or office), a predetermined coverage area may be assigned for the premises for the purpose of calculating the transmit power, according to the premise type.

Figure 16:
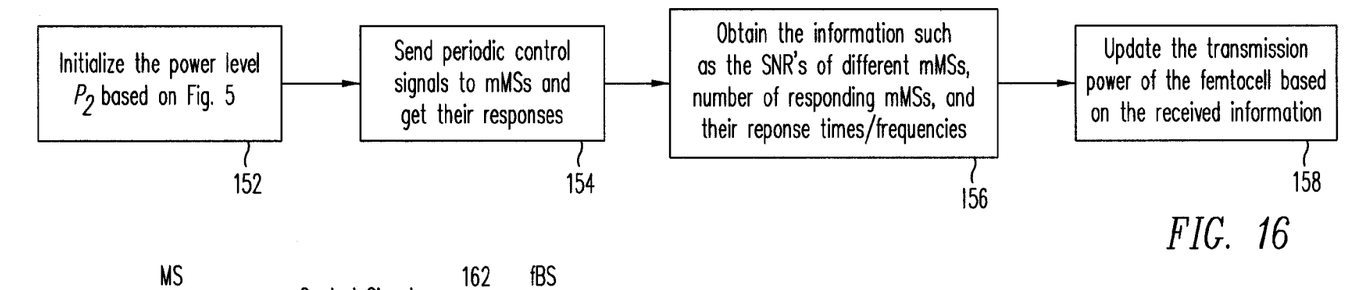
FIG. 16 shows one implementation of a method for refining the calculation of transmit power, in accordance with one embodiment of the present invention.

FIG. 16 shows one implementation of a method for refining the calculation of transmit power, in accordance with one embodiment of the present invention. As shown in FIG. 16, at step 152, an initial transmission power level $P_2$ of the fBS is determined using any method, such as the method of FIG. 14. Then, transmission power level $P_2$ is updated at step 154 by the responses to periodic control signals sent to the MSs. By taking short-term and long-term averages of the received signal powers at the fBS and at the MSs, average signal-to-noise ratios (SNRs) of different MSs may be obtained (step 156). Then, at step 158, the fBS may tune the transmission power level $P_2$ to achieve an acceptable receiver SNR. In other words, based on received signals, the fBS may increase or decrease its transmission power around the initial power estimate to satisfy different SNR metrics.

According to the present invention, various criteria based on SNR may be used to set the power level at the fBS. These criteria may include (a) average SNR at the fBS, (b) average SNR at the MSs, (c) average SNR at the fBS and the MSs, (d) minimum SNRs at the fBS (for different time scales), (e) minimum SNRs at the MSs (at different time scales), and (f) minimum SNRs at the fBS and minimum SNRs at the MSs (at different time scales). The received signals may show smaller variations for a small apartment, so that short-term averages would provide information for necessary power levels, while typically much larger variations are expected for a large house, thereby necessitating long-term averages.

Apart from the received SNR, the fBS may utilize some other metrics for setting its transmission power at step 156 of FIG. 16. For example, if no response is received from any MS to the control messages transmitted from the fBS for a certain period of time, the fBS may conclude that there is no MS to communicate with the fBS at that time. Under such condition, the fBS may set its (pilot) transmission power to a minimum level (i.e., $P_{min}$) to minimize interference with other femtocells and/or the macrocell. Also, the fBS may record the activities of the mMSs at different time scales to adjust its transmission power. For example, between the morning and evening, there may be little connection from MSs to a femtocell, and considerably more activities may occur in the evening. By monitoring such usage patterns, an fBS may decide to minimize its transmission power during the daytime.

Figure 17:
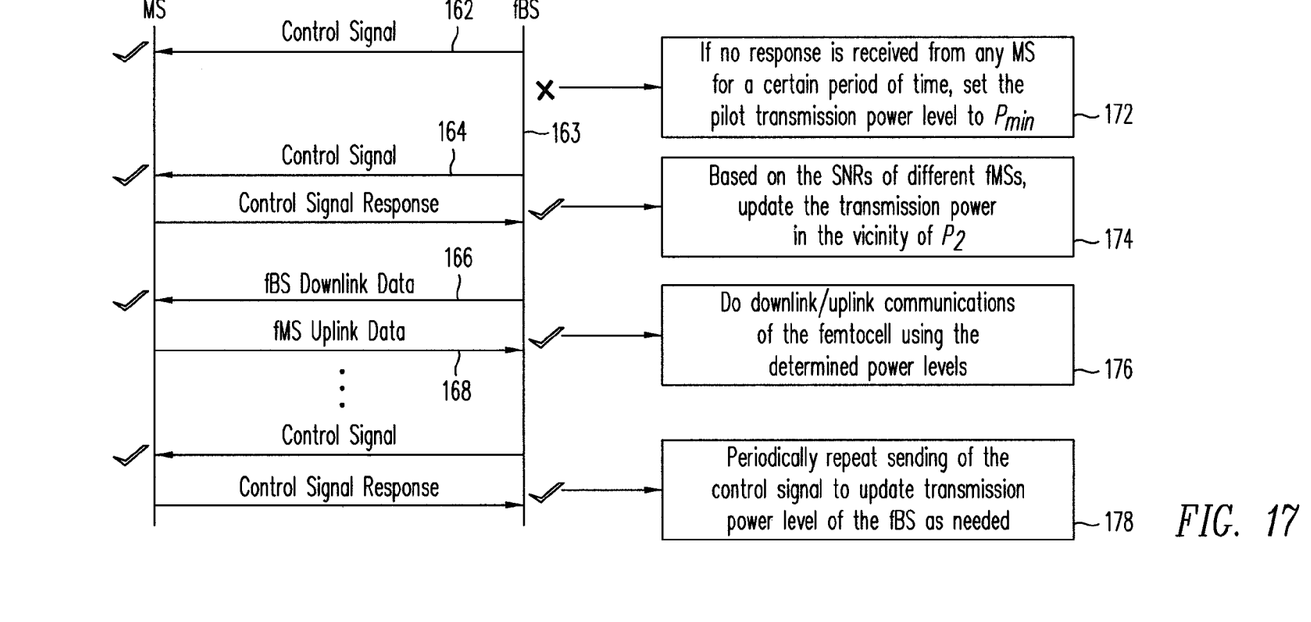
FIG. 17 shows an examplary message exchange between an fBS and an MS, in accordance with one embodiment of the present invention.

FIG. 17 shows an example message exchange between an fBS and an MS, in accordance with one embodiment of the present invention. As shown in FIG. 17, the fBS sends control message 162 initially. If no response is received from any MS to control message 162 after a time period, at step 172, the fBS may set its transmission power to a minimum level to minimize interference to other femtocells and the macrocell. However, if the fBS receives a response 164 from an MS, the fBS may utilize this signal to estimate the SNR of the MS. Once having SNRs calculated from communications with different MSs, the fBS may update at step 174 its transmission power based on the SNRs for future communications (step 176). The fBS may transmit control messages periodically (step 178) to adaptively update its transmission power, in response to changes in the environment (e.g., number of users, locations of users, or channel qualities of the users).

The transmission power level may be determined using, for example, the following method. From equations (4)-(8) above, in a femtocell interference-limited coverage area (ILCA) environment with equal path loss exponents, circular coverage area $A_{fem}$ is given by $$A_{fem} = \pi r^2 = \pi \left( \frac{B_1^2}{4A^2} + \frac{B_2^2}{4A^2} - \frac{C}{A} \right) \quad (31)$$

In a power-controlled femtocell environment, the femtocell provides a coverage area $A_{fem}$ at all times by adjusting its transmission power $P_2$ (which is calculated for a given $A_{fem}$). Equation (31) may be rearranged to:

$$B_1^2 + B_2^2 - 4AC - \frac{4A^2 A_{fem}}{\pi} = 0 \quad (32)$$

which may be simplified to:

$$aP_2^2 + bP_2 + c = 0 \quad (33)$$

Where

-continued $$a = \frac{-4A_{fem}}{\pi} \quad (33)$$

$$b = 4P_1\left((x_1 - x_2)^2 + (y_1 - y_2)^2 + \frac{2A_{fem}}{\pi}\right)$$

$$c = \frac{-4P_1^2 A_{fem}}{\pi}$$

The required power level $P_2$ that provides coverage area $A_{fem}$ may be solved by finding the roots of the second order polynomial of equation (32). Equation (13) above relates the transmit power levels $P_1$ and $P_2$ to the coverage areas of the mBS and the fBS, respectively, for a network in which $n \geq 2$, n being any arbitrary path loss exponent. As discussed above, equation (13) represents the case where n=2, but with a different pair of transmit powers. The techniques above may be used to calculate the required transmit power $P_1$.

The above detailed description is provided to illustrate the specific embodiments of the present invention, and is not intended to be limiting. Numerous variations and modifications are possible within the scope of the present invention. The present invention is set forth in the following claims.

We claim:

1. A method for selecting a frequency band for use in a femtocell located within a coverage area of a macrocell, comprising:
    partitioning the coverage area of the macrocell into an inner region, an outer region, and a power control region located between the inner region and the outer region;
    within a femtocell base station, selecting for the femtocell a frequency band used in the macrocell, when the femtocell is located within the outer region or the power control region;
    within the femtocell base station, selecting for the femtocell a different frequency band than the frequency band used in the macrocell, when the femtocell is located within the inner region;
    within the femtocell base station, selecting a first fixed minimum operating power level for a femtocell base station when the femtocell is located within the inner region;
    within the femtocell base station, selecting a second fixed minimum operating power level for the femtocell base station when the femtocell is located within the outer region; and
    adapting an operating power level for the femtocell base station to achieve a desired coverage area for the femtocell when the femtocell is located within the power control region.

2. The method of claim 1, wherein the partitioning is carried out using one or more parameters derived from one or more of path loss exponents, a transmission power of a base station of the femtocell, a transmission power of a base station of the macrocell, a location of the base station of the femtocell and a location of the base station of the macrocell.

3. The method of claim 1, wherein the desired coverage area is a predetermined coverage area for the femtocell.

4. The method of claim 3, wherein a transmit power level for the femtocell is determined adaptively based on signals received from one or more mobile stations communicating with the femtocell when the femtocell is located within the power control region.

5. The method of claim 4, wherein the received signals are responsive to control signals sent by the femtocell base station.

6. A communication system for a macrocell having a coverage area partitioned into an inner region, an outer region, and a power control region located between the inner region and the outer region, comprising:
    a base station within a femtocell, wherein the femtocell base station is configured to use a frequency band used by the macrocell when the femtocell is located within the power control region or the outer region and to use a different frequency band than the frequency band used by the macrocell when the femtocell is located within the inner region, and wherein the femtocell base station is further configured to adapt its transmit power to achieve a desired coverage area when the femtocell is located within the power control region, and wherein the femtocell base station is further configured to transmit at a first fixed minimum transmission power when the femtocell is within the inner region and to transmit at a second minimum fixed transmission power when the femtocell is within the outer region.

7. The communication system of claim 6, wherein the coverage area is partitioned using one or more parameters derived from one or more of path loss exponents, a transmission power of a base station of the femtocell, a transmission power of a base station of the macrocell, a location of the base station of the femtocell and a location of the base station of the macrocell.

8. The communication system of claim 6, wherein the coverage area of the macrocell is partitioned based on a distance from a base station of the macrocell.

\* \* \* \* \*